(12) United States Patent
Hong

(10) Patent No.: US 12,709,229 B2
(45) Date of Patent: Aug. 18, 2026

(54) STORAGE DEVICE FOR VEHICLE

(71) Applicant: MORIROKU TECHNOLOGY COMPANY, LTD., Tokyo (JP)

(72) Inventor: Song Hong, Tokyo (JP)

(73) Assignee: MORIROKU CO., LTD., Tokyo (JP)

( * ) Notice: Subject to any disclaimer, the term of this patent is extended or adjusted under 35 U.S.C. 154(b) by 369 days.

(21) Appl. No.: 18/487,371

(22) Filed: Oct. 16, 2023

(65) Prior Publication Data

US 2024/0149793 A1 May 9, 2024

(30) Foreign Application Priority Data

Nov. 9, 2022 (JP) ................................ 2022-179627

(51) Int. Cl.
*B60R 7/04* (2006.01)
*B60R 11/00* (2006.01)
*E05B 83/32* (2014.01)

(52) U.S. Cl.
CPC ................ *B60R 7/04* (2013.01); *E05B 83/32* (2013.01); *B60R 2011/0007* (2013.01); *B60R 2011/0094* (2013.01)

(58) Field of Classification Search
CPC ... B60R 2011/0007; B60R 7/04; E05B 83/32; E05B 79/22
See application file for complete search history.

(56) References Cited

U.S. PATENT DOCUMENTS

2016/0194907 A1 7/2016 Kikuchi et al.
2018/0274270 A1 9/2018 Fredriksson et al.
2021/0291710 A1* 9/2021 Ahn ........................ E05C 3/162

FOREIGN PATENT DOCUMENTS

JP 2021-020637 A 2/2021
WO 2014/103672 A1 7/2014

* cited by examiner

*Primary Examiner* — Robert E Fuller
(74) *Attorney, Agent, or Firm* — Rankin, Hill & Clark LLP

(57) ABSTRACT

A lock mechanism includes a lock member that can take a locked position in which the lock member contacts a lid to lock the lid, and an unlocked position in which the lock member is spaced apart from the lid to release the locking, a button that pushes the lock member to cause the lock member to swing to the unlocked position, and a support member that supports both the lock member and the button. The support member has a stopper for locking the lock member in the locked position. The stopper is integrated with the support member. The button is spaced apart from the lock member when the lock member is in the locked position.

13 Claims, 6 Drawing Sheets

STORAGE DEVICE FOR VEHICLE

FIELD OF THE INVENTION

The present invention relates to a vehicle storage device (storage device for a vehicle) having a lock mechanism.

BACKGROUND

Some passenger vehicles have a storage device therein that allows a person in a vehicle to store objects (things, person's belongings, etc.). A conventional storage device for the vehicle, which is provided in a center console, is disclosed in JP-A-2021-020637.

The vehicle storage device disclosed in JP-A-2021-020637 includes a storage box capable of storing objects, a lid capable of opening and closing an opening of the storage box, and a lock mechanism capable of locking the lid.

The lock mechanism includes a lock member capable of locking the lid by a pawl that can engage with the lid, and a button capable of pushing a portion of the lock member opposite to the pawl to cause the lock member to swing thereby allowing the pawl to leave the lid and releasing (unlocking) the locking of the lid.

The member that locks the lid is a swingable lock member. The member that supports the lock member is the button that can move in the front-rear direction. The button has a predetermined dimensional tolerance. That is, both the lock member and the button are members whose positions may change. Also, the buttons have dimensional variations. There is room to improve the lock certainty.

An object of the present invention is to provide a vehicle storage device having a high locking performance.

SUMMARY

According to the present disclosure, there is provided a storage device for a vehicle including a storage box capable of storing an object, a lid capable of opening and closing an opening of the storage box, and a lock mechanism capable of locking the lid.

The lock mechanism has the following elements. A lock member is swingably and capable of being positioned in a locked position at which the lock member contacts the lid and can lock the lid, and an unlocked position at which locking is released. A biasing member exerts a force on the lock member such that the lock member can swing toward the locked position. A button has an action portion for pushing the lock member against the force of the biasing member, and is capable of releasing the locking of the lid. A support member supports both the lock member and the button, and has a stopper for restricting a position of the lock member such that the lock member can remain in the locked position. The stopper is integrated with the support member. The button is spaced apart from the lock member when the lock member is in the locked position.

The present invention can provide the vehicle storage device having a high locking performance.

BRIEF DESCRIPTION OF THE DRAWINGS

FIG. 6A is a diagram useful to describe a state in which the retaining portion contacts a rear end of a rail.

FIG. 6B is a diagram useful to describe a state in which the retaining portion moves over an inclined surface at the rear end of the rail.

FIG. 6C is a diagram useful to describe the retaining portion and the rear end of the rail when assembling of the button to the support member is completed.

DETAILED DESCRIPTION

Figures 1A, 1B:
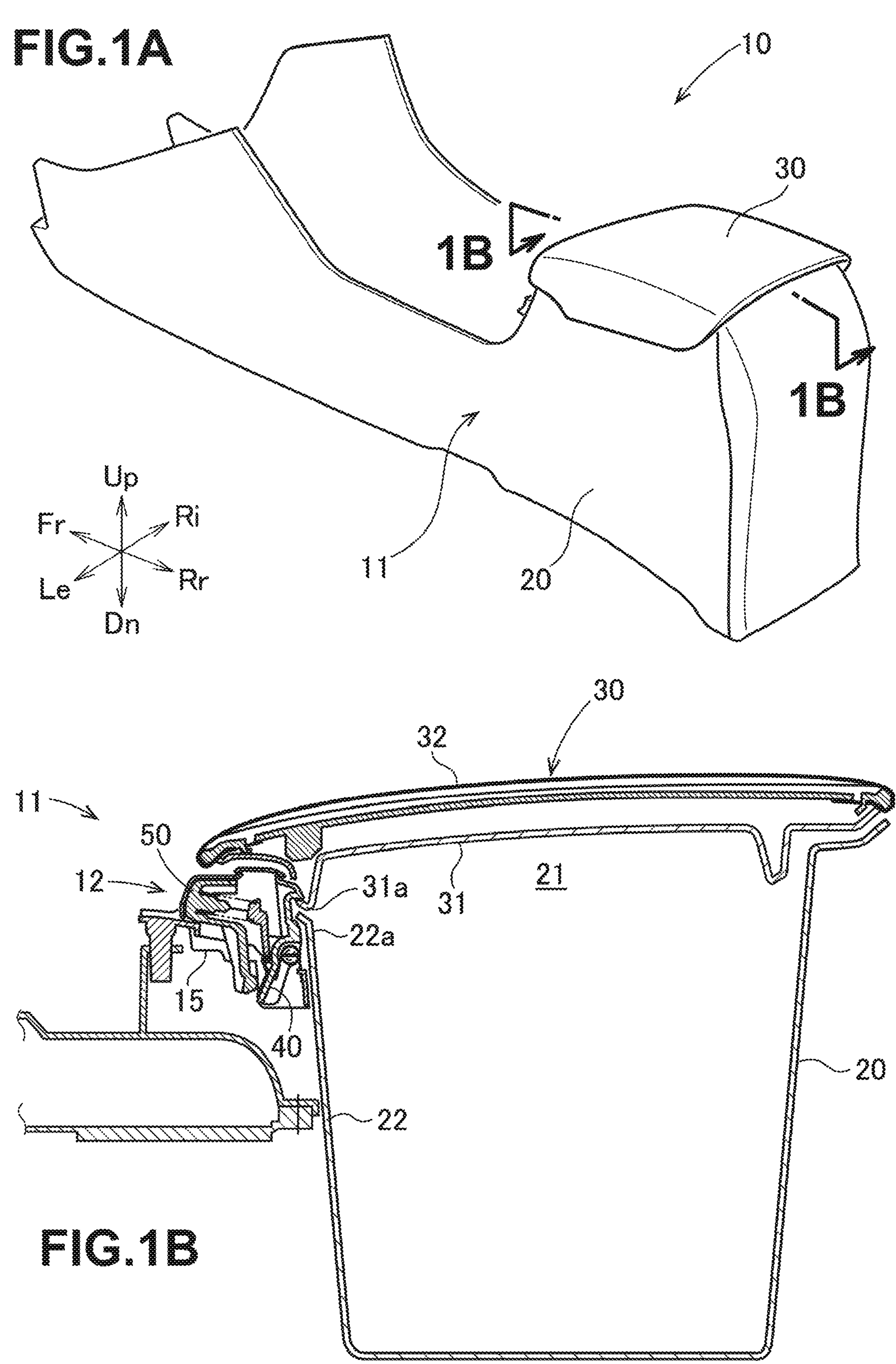
FIG. 1A is a perspective view of a center console with a vehicle storage device according to an embodiment of the invention.
FIG. 1B is a cross-sectional view taken along the line 1B-1B in FIG. 1A.

An embodiment will be described with reference to the accompanying drawings. It should be noted that in the following description, terms "left" and "right" refer to the left and right when viewed from a person in a vehicle, a left-right direction is a width direction of the vehicle, and terms "front" and "rear" refer to the front and rear when viewed in the traveling direction of the vehicle. In the drawings, "Fr" indicates the front, "Rr" indicates the rear, "Le" indicates the left when viewed from the person in the vehicle, "Ri" indicates the right when viewed from the person in the vehicle, "Up" indicates the top or up, and "Dn" indicates the bottom or down.

EMBODIMENT(S)

FIG. 1A illustrates a center console 10 that can be positioned between the driver's seat and the passenger's seat in a passenger vehicle. The center console 10 has a vehicle storage device (storage device for a vehicle) 11 of this embodiment in a rear area thereof.

Referring to FIG. 1B, the vehicle storage device 11 includes a substantially block-shaped storage box 20 having an opening 21, which opens upward, and capable of storing one or more objects (things, personal belongings, etc.), and a lid 30 capable of opening and closing the opening 21 of the storage box 20.

The lid 30 includes a base member 31 that closes the opening 21 and defines a storage space together with the storage box 20, and a skin 32 that covers a cushion material disposed on an upper surface of the base member 31. The base member 31 is supported by the storage box 20 such that the base member can swing about a rear end of the base member 31.

A front end 31*a* of the base member 31 and an upper end 22*a* of a front wall 22 of the storage box 20 can be locked by a lock mechanism 12 provided in front of the front end 31*a* and the upper end 22*a*. A detailed configuration for supporting the lock mechanism 12 will not be described.

Figure 2:
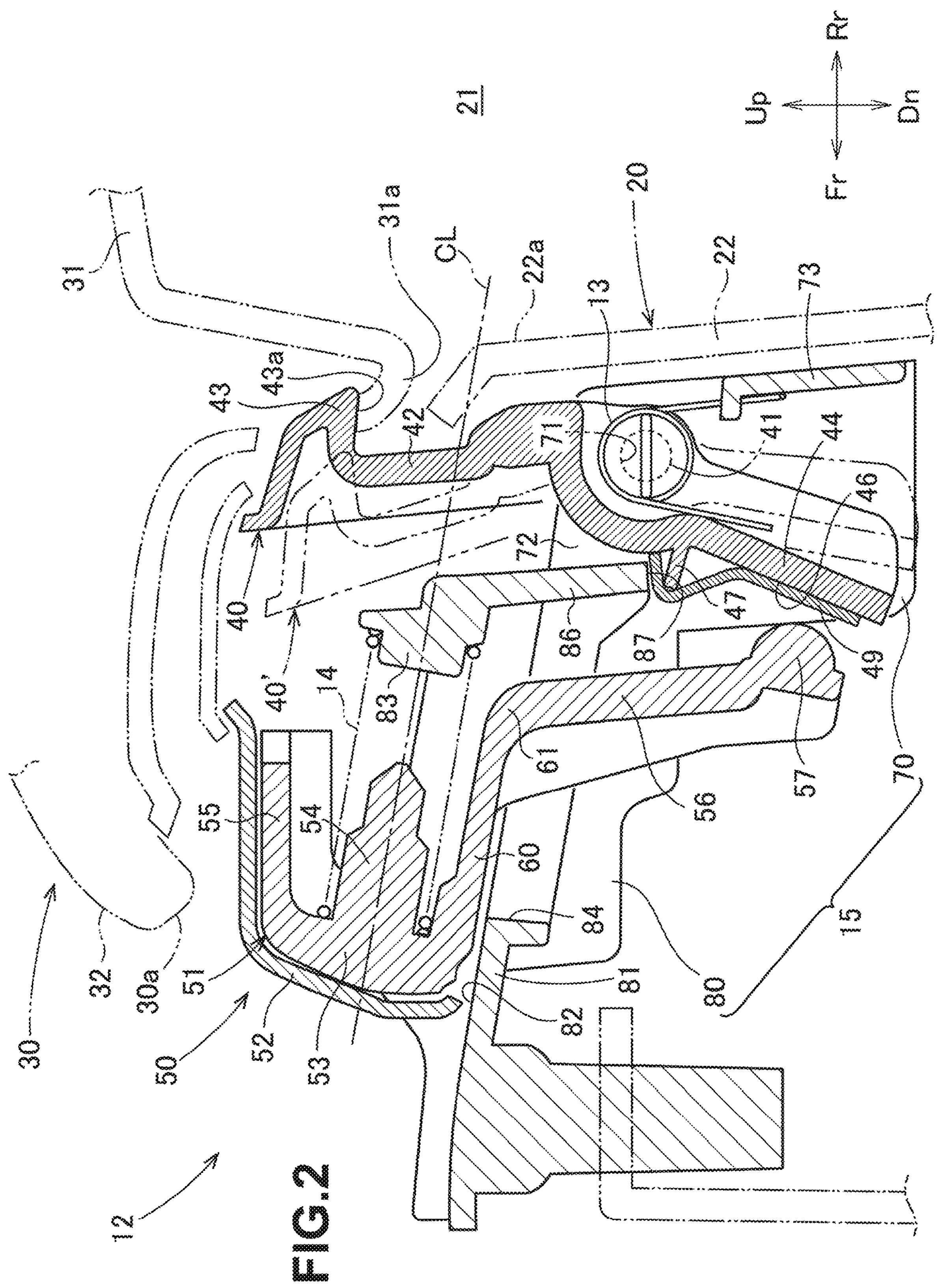
FIG. 2 is a cross-sectional view of the lock mechanism.

Referring to FIG. 2, the lock mechanism 12 includes a lock member 40 that contacts the front end 31*a* of the base member 31 and can lock the lid 30, a torsion spring (biasing member) 13 that applies a force to the lock member 40 such that the lock member 40 can lock the lid 30, a button 50 that can release (unlock) the lock of the lid 30 by pushing the lock member 40 against the force of the torsion spring 13, a compression spring 14 that applies a force to the button 50 in a direction opposite to a direction in which the button 50 is pushed, and a support member 15 that supports the lock member 40 and the button 50.

The lock member 40 has two shafts 41 supported by the support member 15 such that the shafts 41 can rotate (see FIG. 3), a lid-side swing portion 42 that extends from the shafts 41 toward the lid 30 (upward) and is swingable about the shafts 41, and a button-side swing portion 44 that extends from the shafts 41 in a direction substantially opposite to the direction in which the lid-side swing portion 42 extends (downward) and is swingable about the shafts 41 and can be pushed by the button 50. The shafts 41, the lid-side swing portion 42 and the button-side swing portion 44 are integrated (united) in the form of a one piece part.

The distal end of the lid-side swing portion 42 has a pawl 43 that protrudes rearward from the distal end of the lid-side swing portion and can engage with the front end 31*a* of the base member 31.

The button-side swing portion 44 has a flat action-receiving portion 46 that faces forward and is pushed by the button 50, and a plate-shaped stopper-receiving portion 47 that protrudes forward from a position closer to the shafts 41 than the action-receiving portion 46 and receives a stopper 86 (will be described later). The stopper-receiving portion 47 is substantially orthogonal to the action-receiving portion 46. The action-receiving portion 46 and the stopper-receiving portion 47 are covered with a single felt 49.

The torsion spring 13 is disposed around the shafts 41 of the lock member 40. The torsion spring 13 is supported by the support member 15 and also supported by the button-side swing portion 44.

The button 50 can move backward as the button is pushed by a person in the vehicle. Also, the button 50 can move forward as the button is pushed by the compression spring 14.

Figure 3:
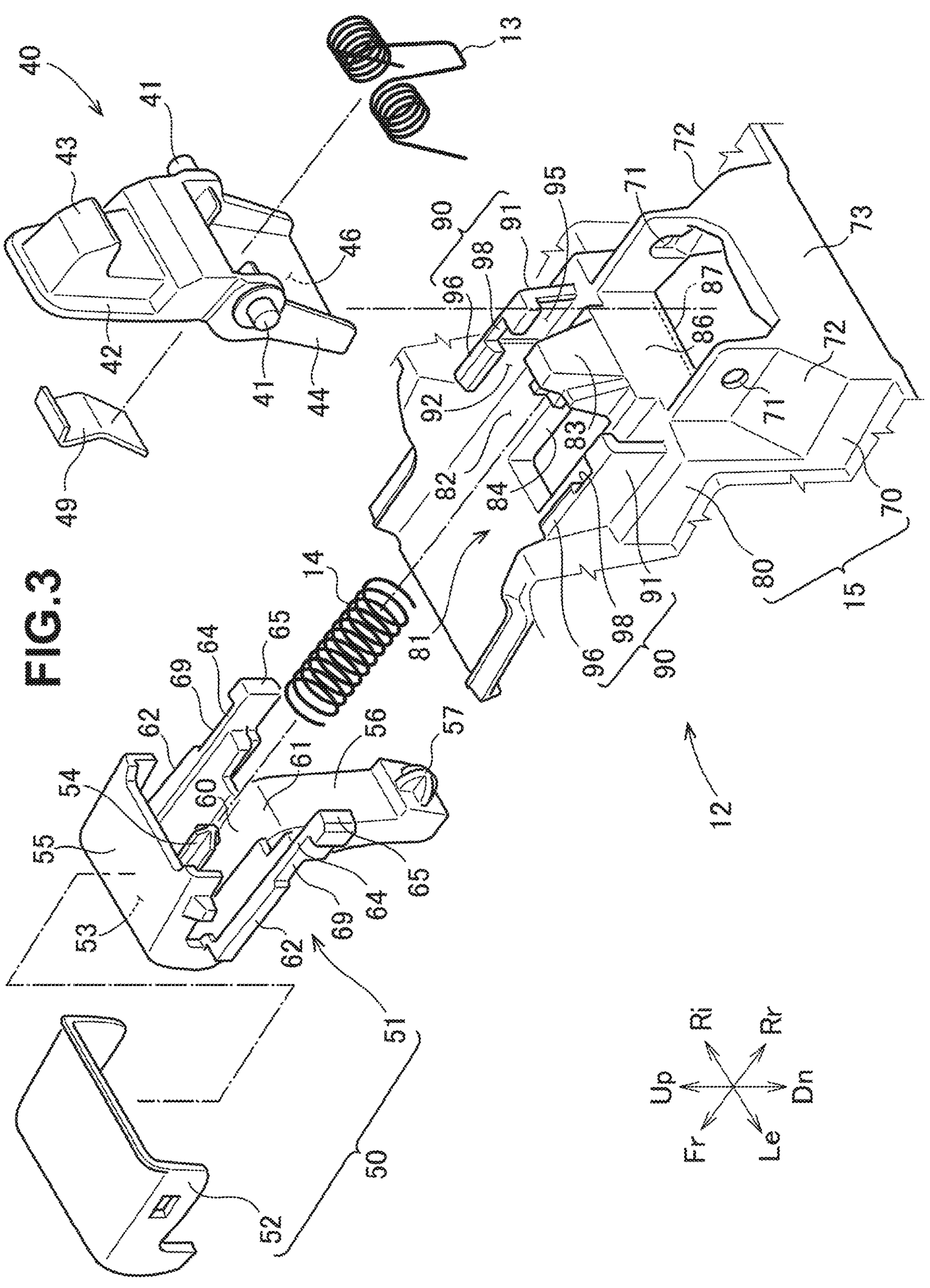
FIG. 3 is an exploded perspective view of the lock mechanism.

Referring to FIGS. 2 and 3, the button 50 has a main body 51 slidable relative to the support member 15, a cover member 52 that covers the main body 51, and an arm 56 that extends downward from the main body 51 (in a direction substantially perpendicular to the moving direction of the main body 51).

The main body 51 has a plate-shaped button lower wall 60 slidable relative to a bottom surface 82 of the support member 15, a plate-shaped button front wall 53 extending upward from the front end of the button lower wall 60, and a plate-shaped button upper wall 55 extending from the upper end of the button front wall 53 toward the lock member 40.

The button front wall 53 can support the front end of the compression spring 14. Further, the button front wall 53 has a column-shaped front end support portion 54 that protrudes rearward from the button front wall 53 and can support the inner peripheral surface of the compression spring 14.

The arm 56 extends downward from a rear end 61 of the button lower wall 60. The distal end of the arm 56 has an action portion (acting portion) 57 that can push the action-receiving portion 46 of the button-side swing portion 44 via the felt 49. The action portion 57 protrudes from the distal end of the arm 56 to the action-receiving portion 46 of the button-side swing portion 44. It should be noted that the action portion 57 does not have to protrude. If necessary, the action-receiving portion 46 may protrude. Therefore, the action portion 57 and the action-receiving portion 46 are not limited to those described in this embodiment.

Referring to FIG. 3, the support member 15 includes a lock member support portion 70 that supports the lock member 40, and a button support portion 80 that is positioned in front of the lock member support portion 70 and supports the button 50. The lock member support portion 70 and the button support portion 80 are integrated in the form of a one piece part.

The lock member support portion 70 includes a pair of plate-shaped shaft support portions 72, 72 that have shaft holes 71, 71 capable of supporting the shafts 41 of the lock member 40 respectively, and a plate-shaped spring support portion 73 that connects the rear ends of the shaft support portions 72, 72 to each other and supports the torsion spring 13.

The button support portion 80 includes a bottom 81 having the bottom surface 82 on which the button lower wall 60 can slide, a pair of rails 90 provided on the bottom 81 and capable of guiding the button 50 to move in the front-rear direction, and a rear end support portion 83 extending upward from the rear end of the bottom 81 and capable of supporting the rear end of the compression spring 14. The bottom 81 has a rectangular through hole 84 through which the arm 56 of the button 50 passes. The through hole 84 is designed not to interfere with the arm 56 when the button 50 moves. The through hole 84 is located in front of the rear end support portion 83.

Referring to FIG. 2, the size (dimensions) of the button 50 is substantially the same as the size (dimensions) of the lock member 40 when viewed in the vertical direction (up-down direction). That is, the upper end of the lid-side swing portion 42 of the lock member 40 is located behind the button upper wall 55. The action-receiving portion 46 provided near the distal end of the button-side swing portion 44 is located behind the rear of the action portion 57 of the button 50. The center line CL of the compression spring 14 extends in the forward ascending direction (front upward direction). The shafts 41 of the lock member 40 are located below the center line CL.

A position where the lower end face 43*a* of the pawl 43 contacts the front end 31*a* of the base member 31 of the lid 30 such that the upward swing of the lid 30 is restricted is referred to as the locked position.

The lock member 40 is secured in the locked position by the stopper 86. The stopper 86 is formed to extend downward from the rear end support portion 83 of the button support portion 80, and is integrated with the button support portion 80. The stopper 86 has a contact surface 87 that can be brought into contact with the stopper-receiving portion 47 of the button-side swing portion 44 via the felt 49. The contact surface 87 faces downward and can make surface contact with the stopper-receiving portion 47. It should be noted that a rib or the like may be formed on the contact surface 87 such that the rib or the like may make line contact with the stopper-receiving portion 47. The action portion 57 of the button 50 is spaced apart from the action-receiving portion 46 of the lock member 40 when the lock member 40 is in the locked position.

The lock member 40' indicated by dashed lines is positioned in the unlocked position of the lid 30. In the unlocked position, the action portion 57 of the button 50 pushes the action-receiving portion 46 of the lock member 40, and the pawl 43 is spaced apart from the lid 30.

Referring to FIG. 3, the button lower wall 60 has a pair of slide portions 62, 62 that are slidable relative to the rails 90 when the button 50 is operated. Further, the button lower wall 60 has a pair of extending portions 64 extending rearward from the left and right ends of the rear end of the button lower wall 60, respectively. The extending portions 64 have retaining portions 65 that protrude outward in the vehicle width direction from the distal end thereof and prevent the button 50 from coming out of the rails 90. A recess 69 that opens outward in the vehicle width direction is formed between each retaining portion 65 and the associated slide portion 62.

Each of the rails 90 includes a rail side wall 91 that extends upward from the bottom 81 and guides the movement of the button 50 in the front-rear direction, and a rail upper wall 96 that extends inward in the vehicle width direction from the upper end of the rail side wall 91 and restricts the upward movement of the button 50.

Each of the rail upper walls 96 has an assembling groove (mounting slot) 98 through which the retaining portion 65 can pass when the button 50 is assembled to the rails 90. Each of the assembling grooves 98 is formed in the rail upper wall 96 such that the assembling groove 98 extends in the up-down direction.

Figures 4A, 4B, 4C:
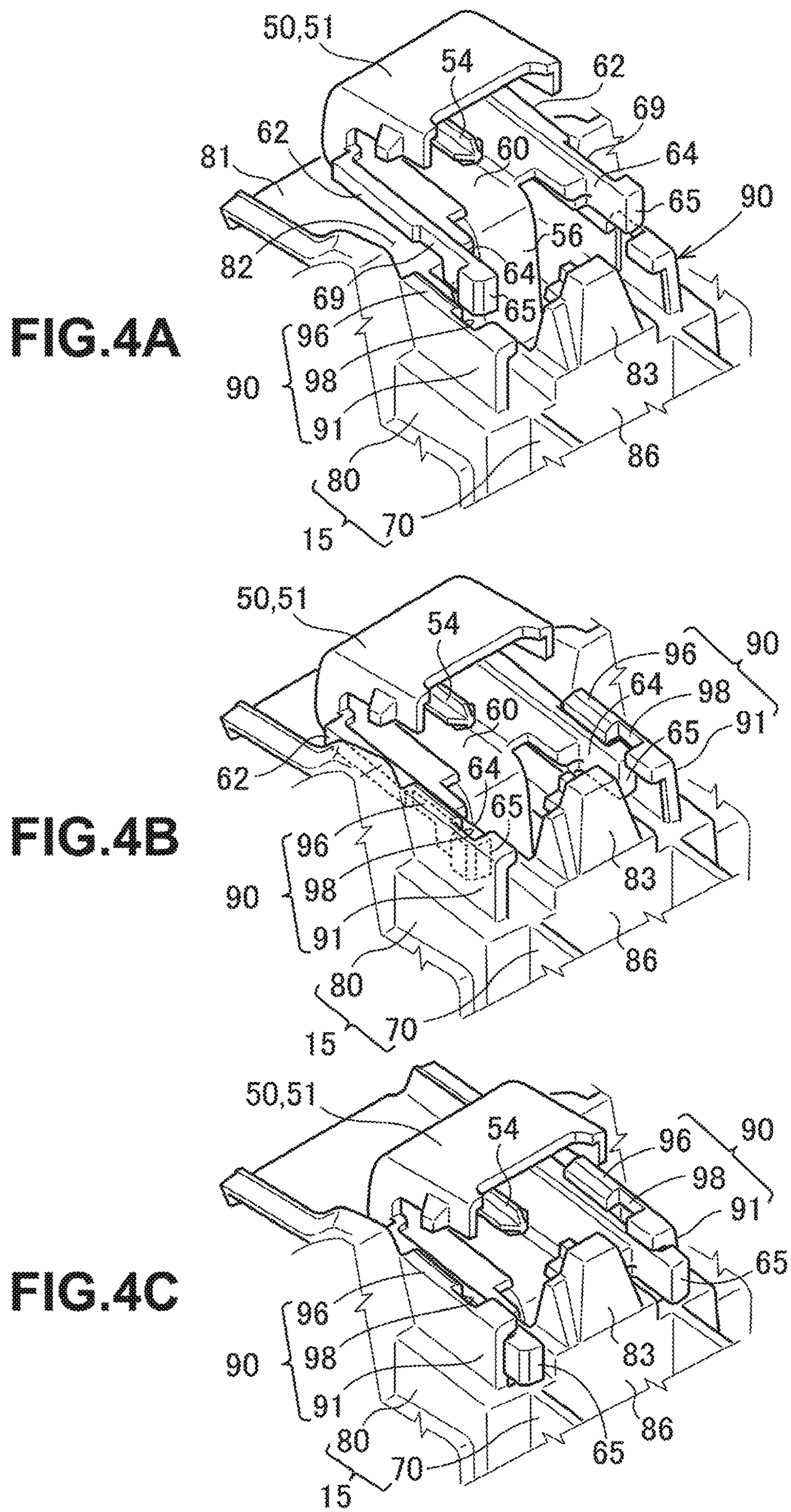
FIG. 4A is a diagram useful to describe a retaining portion of a button being positioned above an assembling groove of a support member.
FIG. 4B is a diagram useful to describe the retaining portion of the button passing through the assembling groove of the support member.
FIG. 4C is a diagram useful to describe completion of the assembling of the button with the support member.

Referring to FIG. 4A, firstly, the arm 56 of the button 50 is positioned inside the through hole 84 (see FIG. 2) of the bottom 81, and the retaining portions 65 are positioned above the assembling grooves 98, respectively. Then, the button 50 is moved downward.

Referring to FIG. 4B, the retaining portions 65 pass through the assembling grooves 98 and contact the bottom surface 82 (see FIG. 5B) of the bottom 81 of the button support portion 80.

Referring to FIG. 4C, finally, the button 50 is pushed backward until the entire retaining portions 65 protrude rearward from the rail side walls 91. The position of the button 50 illustrated in FIG. 4C is the same as the position of the button 50 illustrated in FIG. 2. The button 50 is positioned at the most front position in the movable range.

Figure 5B:
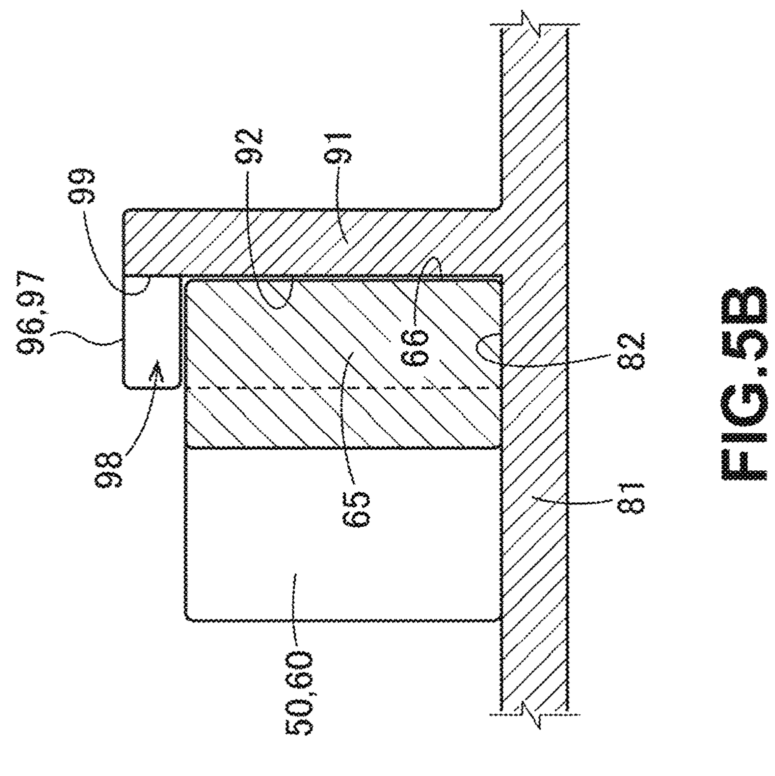
FIG. 5B is a cross-sectional view taken along the line 5B-5B in FIG. 5A.
Figure 5A:
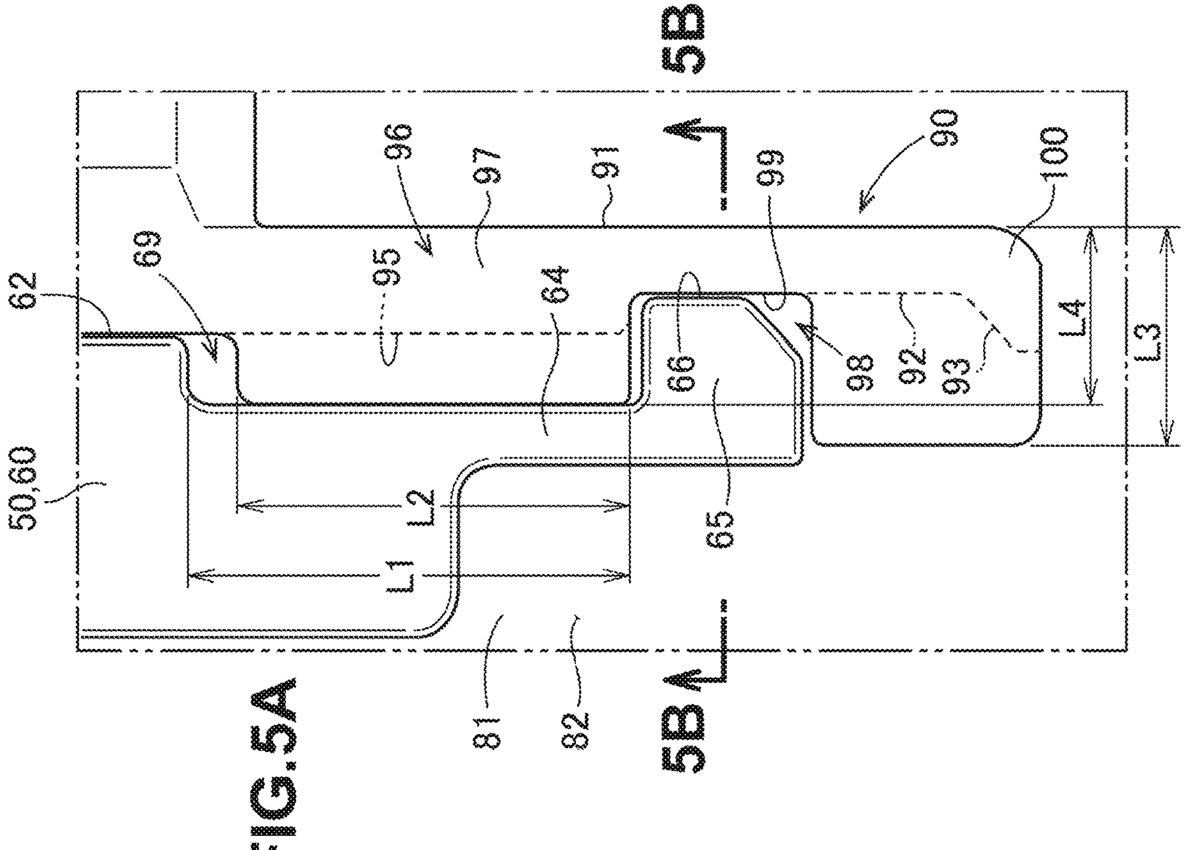
FIG. 5A is a plan view to illustrate a state in which the retaining portion of the button passes through the assembling groove of the support member.

Supplementary description to the above-mentioned assembling process will be given below. Referring to FIGS. 5A and 5B, a portion of the rail upper wall 96 that is forward of the assembling groove 98 is referred to as an upper wall front portion 97. When viewed in the moving direction (front-rear direction) of the button 50 in use, the dimension L1 of the recess 69 is larger than the dimension L2 of the upper wall front portion 97 (L1>L2).

The rail side wall 91 has a retaining portion guide surface 92 that can guide a side surface 66 of the retaining portion 65 in the front-rear direction (see FIGS. 4B and 4C). Referring to FIG. 5B, the retaining portion guide surface 92 and a bottom surface 99 of the assembling groove 98 are located on substantially the same plane. The extending portion 64 does not bend as the retaining portion 65 passes through the assembling groove 98 and contacts the bottom surface 82 of the button support portion 80.

Figures 6A, 6B, 6C:
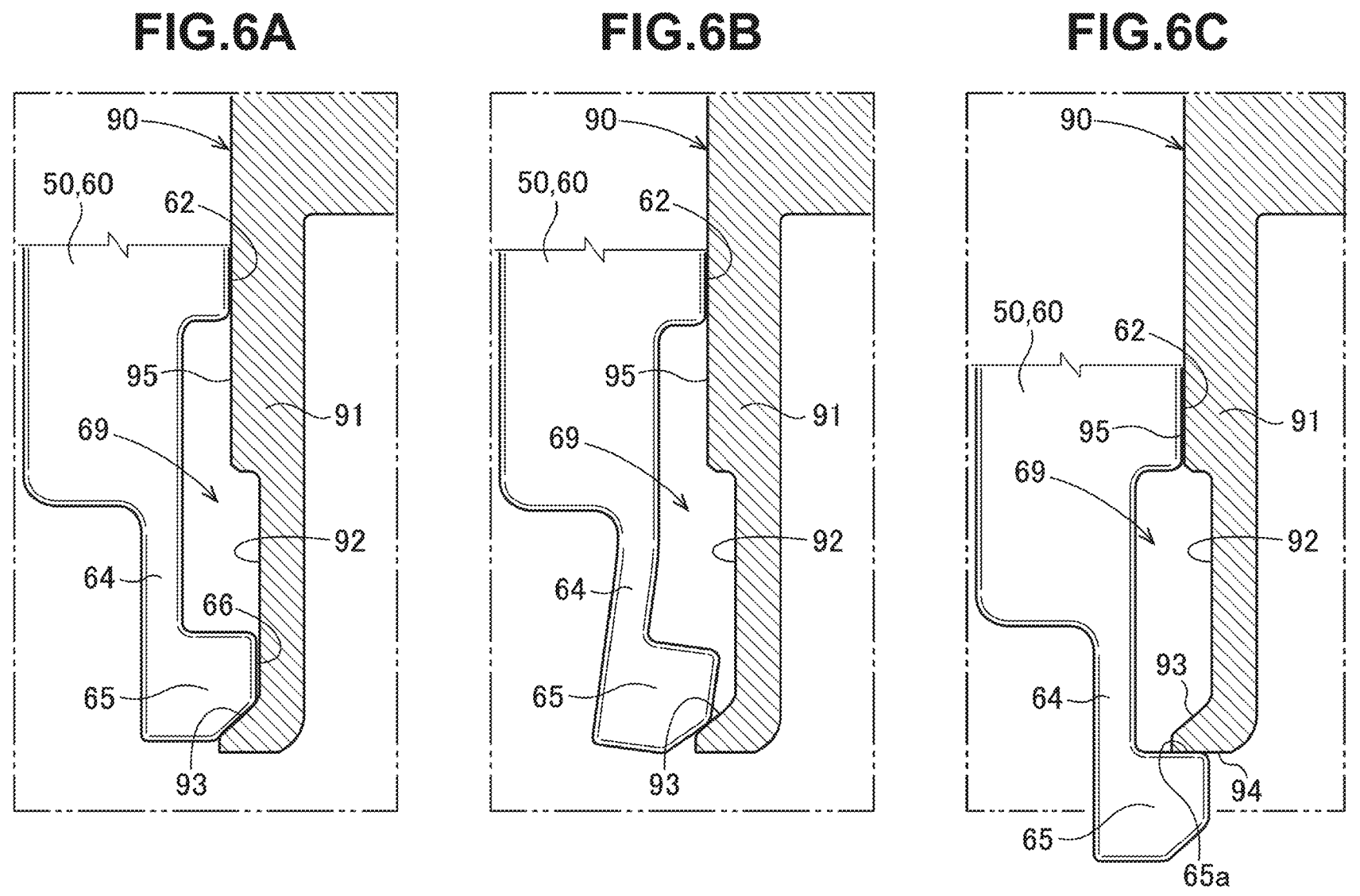

Referring to FIG. 6A, the rear end of the retaining portion guide surface 92 has an inclined surface 93 extending inward and rearward in the vehicle width direction.

When the button 50 is pushed backward from the position illustrated in FIG. 5A, the chamfered corner of the retaining portion 65 contacts the inclined surface 93. When the button 50 is further pushed backward, as illustrated in FIG. 6B, the extending portion 64 bends inward in the vehicle width direction and the retaining portion 65 slides on the inclined surface 93.

When the button 50 is further pushed backward, the retaining portion 65 rides over the inclined surface 93. As illustrated in FIG. 6C, a front face 65*a* of the retaining portion 65 contacts a rear face 94 of the rail side wall 91. The retaining portion 65 restricts forward movement of the button 50.

It should be noted that the rail side wall 91 has a slide portion guide surface 95 that can guide the slide portion 62 when the button 50 is operated. The slide portion guide surface 95 is positioned forward of the retaining portion guide surface 92. The slide portion guide surface 95 is located on the inner side in the vehicle width direction than the retaining portion guide surface 92. Further, as illustrated in FIG. 5A, a portion of the rail upper wall 96 that is rearward of the assembling groove 98 is referred to as an upper wall rear portion 100. When viewed in the vehicle width direction (left-right direction), the dimension L3 of the upper wall rear portion 100 is larger than the dimension L4 of the upper wall front portion 97 (L3>L4).

Referring to FIG. 2, the lock mechanism 12 includes the lock member 40 that is swingable and can be positioned in the locked position in which the lock member 40 contacts the lid 30 to lock the lid 30, the torsion spring 13 that applies a force to the lock member 40 such that the lock member 40 can swing toward the locked position, the button 50 that has the action portion 57 to push the lock member 40 against the force of the torsion spring 13 and can release (unlock) the lock of the lid 30, and the support member 15 that supports both the lock member 40 and the button 50.

The support member 15 has the stopper 86 that restricts the position of the lock member 40 such that the lock member 40 can remain in a predetermined position. The stopper 86 is integrated with the support member 15. The button 50 is spaced apart from the lock member 40 when the lock member 40 is in the locked position.

That is, the stopper 86 is a portion that is integral with the support member 15 and does not move. That portion of the support member 15 which supports the lock member 40 secures the lock member 40 in the locked position. In addition, the button 50 is not involved in locking the lid 30 by the lock member 40. Therefore, it is possible to more reliably hold the lock member 40 in the predetermined locked position, and to provide the vehicle storage device 11 having the high locking performance.

The lock member 40 includes the lid-side swing portion 42 extending radially outward of the shafts 41, from the shafts 41, which serve in combination as the swing center, and capable of contacting the lid 30, and the button-side swing portion 44 extending from the shafts 41 in a direction substantially opposite to a direction in which the lid-side swing portion 42 extends and having the action-receiving portion 46 that is pushed by the action portion 57 of the button 50. The button-side swing portion 44 has the stopper-receiving portion 47 that receives (abuts) the stopper 86.

The stopper-receiving portion 47 may be provided so as to be able to contact the lid-side swing portion 42, for example, but this may affect the space of the storage box 20. In this embodiment, since the stopper-receiving portion 47 is provided on the button-side swing portion 44, the stopper-receiving portion 47 does not affect the space of the storage box 20. Further, since the stopper 86 has a plate shape extending in the load-acting direction, the stopper 86 has high rigidity and can stably support the stopper-receiving portion 47. Also, the space in the front-rear direction can be made compact.

Further, the stopper-receiving portion 47 and the action-receiving portion 46 are located close to each other. Therefore, the stopper-receiving portion 47 and the action-receiving portion 46 can be covered with the single felt 49. That portion of the felt 49 which covers the stopper-receiving portion 47 and that portion of the felt 49 which covers the action-receiving portion 46 may be separate from each other. The action-receiving portion 46 may not be covered with the felt 49.

When viewed in the radial direction of the shaft 41, the action-receiving portion 46 of the button-side swing portion 44 is located radially outward of the stopper-receiving portion 47. That is, the action-receiving portion 46 is provided at a position away from the shaft 41. A small force can cause the lock member 40 to swing, and therefore unlocking is facilitated.

The button 50 has the main body 51 that can slide relative to the support member 15, and the arm 56 that extends downward from the main body 51. The action portion 57 of the button 50 is located at the distal end of the arm 56. The arm 56 may not be provided on the button 50. However, if the arm 56 is not provided, the main body 51 of the button 50 will be positioned in front of the action-receiving portion 46, and the main body 51 of the button 50 will be located at a far lower position from a front end 30*a* of the lid 30.

On the other hand, when the arm 56 is provided, the main body 51 of the button 50 is located close to the front end of the lid 30. When the vehicle storage device 11 is provided in the center console 10, a person in the vehicle can easily push the button 50 while the person is placing a person's elbow on the center console 10. Further, the locking position of the lock member 40 is close to the person's operation surface.

Referring to FIG. 3, the support member 15 has the pair of rails 90 that can guide the movement of the button 50. The button 50 has the pair of slide portions 62 that can slide relative to the rails 90, and a pair of retaining portions 65 that protrude, in opposite directions away from each other, from the end portions of the slide portions 62 respectively to prevent the button 50 from coming off from the rails 90. Each of the rails 90 has the rail side wall 91 that can guide the slide portion 62 in the front-rear direction, and the rail upper wall 96 that extends from the upper end of the rail side wall 91 in a direction toward the other rail. Each of the rail upper walls 96 has an assembling groove 98 through which the retaining portion 65 can pass when the button 50 is assembled to the rails 90.

If the front ends of the rails 90 are used as entrances to assemble the button 50 to the support member 15, it is necessary to align the positions of the retaining portions 65 with the front ends of the rails 90 respectively, and it is necessary to bend the extending portions 64 such that the retaining portions 65 can slide on the rails 90 respectively, which requires a certain amount of labor.

On the other hand, the rails 90 of this embodiment have the assembling grooves 98, and therefore it is only necessary to align the retaining portions 65 with the assembling grooves 98 when the button 50 is assembled to the rails 90. It is not necessary to bend the extending portions 64. Thus, the assembling work can be performed with a minimum force and the assembling work is facilitated while ensuring the guiding property of the slide portions 62.

Further, if the front ends of the rails 90 are used as entrances to assemble the button 50 to the support member 15, the arm 56 is not in contact with the support member 15, and therefore it is necessary for the through hole 84 to have a large size, i.e., the support member 15 becomes large in size. On the other hand, the above-described configuration of this embodiment can achieve space-saving without increasing the size of the support member 15.

Referring to FIG. 5A, the recess 69 which opens in the protruding direction of the retaining portion 65 is formed between the slide portion 62 and the retaining portion 65. A portion of the rail upper wall 96 which is forward of the assembling groove 98 is referred to as the upper wall front portion 97. When viewed in the moving direction of the button 50 in use, the dimension of the recess 69 is larger than the dimension of the upper wall front portion 97. Therefore, it is possible to achieve the space-saving while maintaining the guiding property.

The present invention is not limited to the above-described embodiment as long as the operations and advantageous effects of the present invention are achieved.

What is claimed is:

1. A storage device for a vehicle comprising:

a storage box capable of storing an object, a lid capable of opening and closing an opening of the storage box, and a lock mechanism capable of locking the lid, wherein the lock mechanism includes:

a lock member provided swingably and capable of being positioned in a locked position at which the lock member contacts the lid and can lock the lid, and an unlocked position at which locking is released;

a biasing member that exerts a force on the lock member such that the lock member is biased to swing toward the locked position;

a button having an action portion for pushing the lock member against the force of the biasing member, and capable of releasing the locking of the lid; and a support member that supports both the lock member and the button, the support member having a stopper for restricting a position of the lock member such that the lock member can remain in the locked position, the stopper being integrated with the support member and disposed at a location between the button and the lock member, and the button being spaced apart from the lock member when the lock member is in the locked position.

2. The storage device for the vehicle according to claim 1, wherein the lock member includes:

a lid-side swing portion that extends from a shaft, which serves as a swing center, in a direction radially outward of the shaft and that can contact the lid; and a button-side swing portion that extends from the shaft in a direction substantially opposite to the direction in which the lid-side swing portion extends, and that has an action-receiving portion pushed by the action portion of the button, and the button-side swing portion has a stopper-receiving portion that receives the stopper.

3. The storage device for the vehicle according to claim 2, wherein the support member includes a pair of rails that can guide a movement of the button, the button includes a pair of slide portions that are slidable relative to the pair of rails respectively, and a pair of retaining portions that protrude, in directions away from each other, from ends of the pair of slide portions respectively, and are configured to prevent the button from coming off the pair of rails, each of the rails includes a rail side wall that can guide the slide portion in a front-rear direction, and a rail upper wall that extends, in a direction toward the other rail, from an upper end of the rail side wall, and each of the rail upper walls includes an assembling groove through which the retaining portion can pass when the button is assembled to the pair of rails.

4. The storage device for the vehicle according to claim 3, wherein for each of the pair of slide portions, a recess is formed between the slide portion and the retaining portion such that the recess is open in a direction in which the retaining portion protrudes, a portion of the rail upper wall in front of the assembling groove is defined as an upper wall front portion, and a dimension of the recess is larger than a dimension of the upper wall front portion when viewed in a moving direction of the button in use.

5. The storage device for the vehicle according to claim 1, wherein the button includes a main body slidable relative to the support member, and an arm extending downward from the main body, and the action portion of the button is located at a distal end of the arm.

6. The storage device for the vehicle according to claim 5, wherein the support member includes a pair of rails that can guide a movement of the button, the button includes a pair of slide portions that are slidable relative to the pair of rails respectively, and a pair of retaining portions that protrude, in directions away from each other, from ends of the pair of slide portions respectively, and are configured to prevent the button from coming off the pair of rails, each of the pair of rails includes a rail side wall that can guide the slide portion in a front-rear direction, and a rail upper wall that extends, in a direction toward the other rail, from an upper end of the rail side wall, and each of the rail upper walls includes an assembling groove through which the retaining portion can pass when the button is assembled to the pair of rails.

7. The storage device for the vehicle according to claim 6, wherein for each of the pair of slide portions, a recess is formed between the slide portion and the retaining portion such that the recess is open in a direction in which the retaining portion protrudes, a portion of the rail upper wall in front of the assembling groove is defined as an upper wall front portion, and a dimension of the recess is larger than a dimension of the upper wall front portion when viewed in a moving direction of the button in use.

8. The storage device for the vehicle according to claim 1, wherein the support member includes a pair of rails that guide a movement of the button, and the button includes a pair of slide portions and a pair of retaining portions, the slide portions being slidable relative to the pair of rails respectively, and the pair of retaining portions protrude, in directions away from each other, from ends of the pair of slide portions respectively, and prevent the button from coming off the pair of rails.

9. A storage device for a vehicle comprising:

a storage box capable of storing an object, a lid capable of opening and closing an opening of the storage box, and a lock mechanism capable of locking the lid, wherein the lock mechanism includes a lock member provided swingably and capable of being positioned in a locked position at which the lock member contacts the lid and can lock the lid, and an unlocked position at which locking is released;

a biasing member that exerts a force on the lock member such that the lock member is biased to swing toward the locked position;

a button having an action portion for pushing the lock member against the force of the biasing member, and capable of releasing the locking of the lid; and a support member that supports both the lock member and the button, the support member having a stopper for restricting a position of the lock member such that the lock member can remain in the locked position, the stopper being integrated with the support member, and the button being spaced apart from the lock member when the lock member is in the locked position, wherein the lock member includes:

a lid-side swing portion that extends from a shaft, which serves as a swing center, in a direction radially outward of the shaft and that can contact the lid; and a button-side swing portion that extends from the shaft in a direction substantially opposite to the direction in which the lid-side swing portion extends, and that has an action-receiving portion pushed by the action portion of the button, and the button-side swing portion has a stopper-receiving portion that receives the stopper, wherein when viewed in a radial direction of the shaft, the action-receiving portion of the button-side swing portion is located radially outward of the stopper-receiving portion.

10. The storage device for the vehicle according to claim 9, wherein the support member includes a pair of rails that can guide a movement of the button, the button includes a pair of slide portions that are slidable relative to the pair of rails respectively, and a pair of retaining portions that protrude, in directions away from each other, from ends of the pair of slide portions respectively, and are configured to prevent the button from coming off the pair of rails, each of the pair of rails includes a rail side wall that can guide the slide portion in a front-rear direction, and a rail upper wall that extends, in a direction toward the other rail, from an upper end of the rail side wall, and each of the rail upper walls includes an assembling groove through which the retaining portion can pass when the button is assembled to the pair of rails.

11. The storage device for the vehicle according to claim 10, wherein for each of the pair of slide portions, a recess is formed between the slide portion and the retaining portion such that the recess is open in a direction in which the retaining portion protrudes, a portion of the rail upper wall in front of the assembling groove is defined as an upper wall front portion, and a dimension of the recess is larger than a dimension of the upper wall front portion when viewed in a moving direction of the button in use.

12. A storage device for a vehicle comprising:

a storage box capable of storing an object, a lid capable of opening and closing an opening of the storage box, and a lock mechanism capable of locking the lid, wherein the lock mechanism includes a lock member provided swingably and capable of being positioned in a locked position at which the lock member contacts the lid and can lock the lid, and an unlocked position at which locking is released;

a biasing member that exerts a force on the lock member such that the lock member is biased to swing toward the locked position;

a button having an action portion for pushing the lock member against the force of the biasing member, and capable of releasing the locking of the lid; and a support member that supports both the lock member and the button, the support member having a stopper for restricting a position of the lock member such that the lock member can remain in the locked position, the stopper being integrated with the support member, and the button being spaced apart from the lock member when the lock member is in the locked position, wherein the support member includes a pair of rails that can guide a movement of the button, the button includes a pair of slide portions that are slidable relative to the pair of rails respectively, and a pair of retaining portions that protrude, in directions away from each other, from ends of the pair of slide portions respectively, and are configured to prevent the button from coming off the pair of rails, each of the rails includes a rail side wall that can guide the slide portion in a front-rear direction, and a rail upper wall that extends, in a direction toward the other rail, from an upper end of the rail side wall, and each of the rail upper walls includes an assembling groove through which the retaining portion can pass when the button is assembled to the pair of rails.

13. The storage device for the vehicle according to claim 12, wherein for each of the pair of slide portions, a recess is formed between the slide portion and the retaining portion such that the recess is open in a direction in which the retaining portion protrudes, a portion of the rail upper wall in front of the assembling groove is defined as an upper wall front portion, and a dimension of the recess is larger than a dimension of the upper wall front portion when viewed in a moving direction of the button in use.

* * * * *